(12) United States Patent
Glaser et al.

(10) Patent No.: US 7,934,746 B2
(45) Date of Patent: May 3, 2011

(54) MOTOR VEHICLE WITH AN A-COLUMN AND AIRBAG INCORPORATED THEREIN

(75) Inventors: Carsten Glaser, Mühltal (DE); Thomas Roemer, Rüsselsheim (DE); Michael Silz, Heidesheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 12/432,386

(22) Filed: Apr. 29, 2009

(65) Prior Publication Data

US 2009/0267330 A1    Oct. 29, 2009

(30) Foreign Application Priority Data

Apr. 29, 2008   (DE) .................. 10 2008 021 265

(51) Int. Cl.
*B60R 21/20* (2006.01)

(52) U.S. Cl. .................................................. 280/728.3

(58) Field of Classification Search ............... 280/728.3, 280/730.2

See application file for complete search history.

(56) References Cited

U.S. PATENT DOCUMENTS

| 6,152,485 | A | 11/2000 | Kato |
| 6,502,855 | B1* | 1/2003 | Greiner et al. ............. 280/730.2 |
| 7,621,556 | B2* | 11/2009 | Itakura ........................ 280/728.2 |
| 2005/0116447 | A1 | 6/2005 | Ryu |
| 2008/0238053 | A1 | 10/2008 | Downey et al. |

FOREIGN PATENT DOCUMENTS

| DE | 102005016993 A1 | 11/2006 |
| DE | 102006002467 A1 | 7/2007 |

OTHER PUBLICATIONS

German Patent Office, German Search Report for German Application No. 102008021265.2, Apr. 20, 2010.

* cited by examiner

*Primary Examiner* — Faye M. Fleming
(74) *Attorney, Agent, or Firm* — Ingrassia Fisher & Lorenz, P.C.

(57) ABSTRACT

A motor vehicle with a passenger compartment is provided with an A-column, which is arranged to the side of a windshield of the motor vehicle, as well as a cross strut joined with the A-column. The A-column and cross strut are spaced apart from each other and joined with a lateral wall section of the passenger compartment. A cladding section is further arranged on the side facing the vehicle interior, which is joined with the A-column. The A-column accommodates an airbag that is arranged between the A-column and the first cladding section, and extends toward the front until over the area where the cross strut engages the A-column.

18 Claims, 2 Drawing Sheets

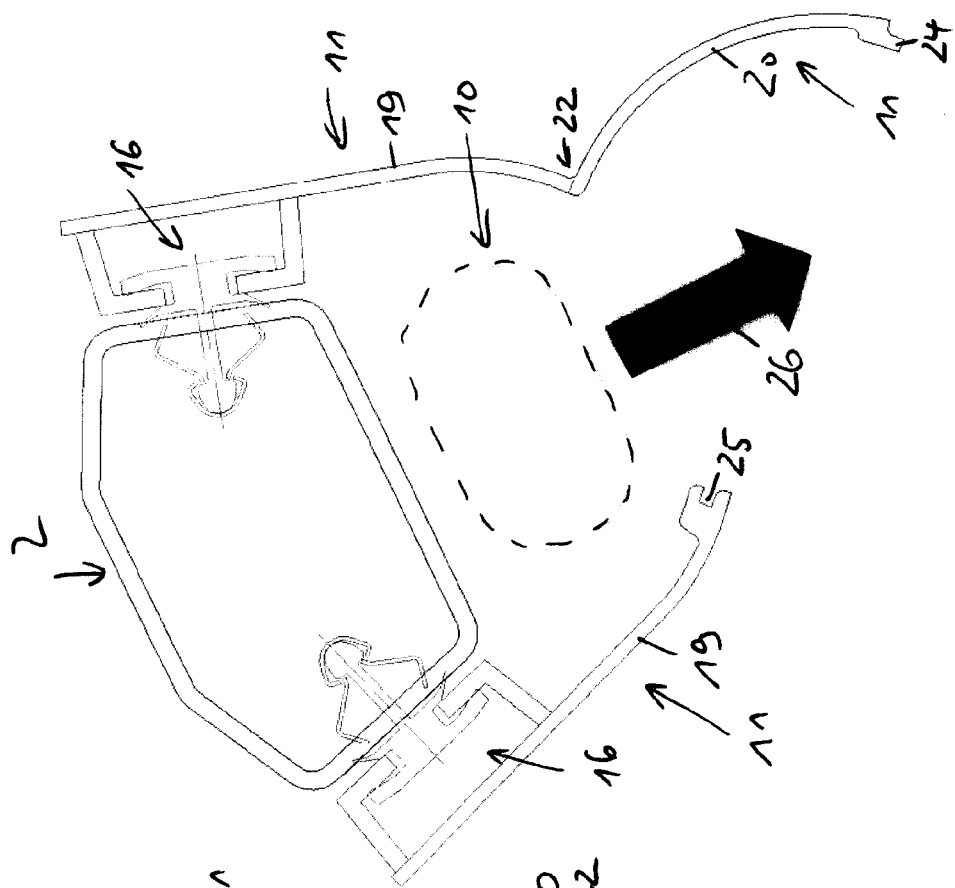
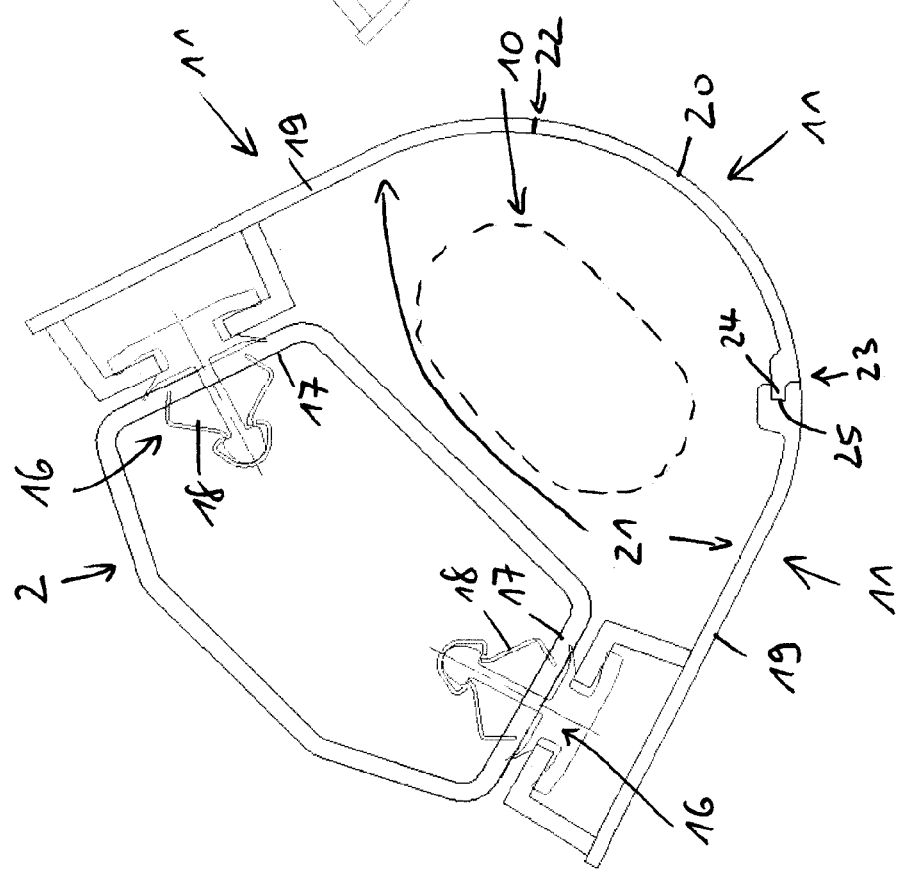

MOTOR VEHICLE WITH AN A-COLUMN AND AIRBAG INCORPORATED THEREIN

CROSS-REFERENCE TO RELATED APPLICATION

This application claims priority to German Patent Application No. 102008021265.2, filed Apr. 29, 2008, which is incorporated herein by reference in its entirety.

TECHNICAL FIELD

The invention relates to a motor vehicle with a passenger compartment that exhibits an A-column, which is arranged to the side of a windshield of the vehicle, as well as a cross strut joined with the A-column, and the A-column and cross strut are spaced apart from each other and joined with a lateral wall section of the passenger compartment, wherein a (first) cladding section is further arranged on the side facing the vehicle interior.

BACKGROUND

A modern trend in vehicle design—primarily in vans or minivans—involves providing a small triangular pane or triangular design element in the front area of the passenger compartment on the side. In particular, the latter element painted the same color as the vehicle. This triangular element is accommodated in the space formed between the A-column, cross strut and lateral wall section.

The cross strut is used to brace the A-column. This must be viewed in particular from the standpoint of passenger compartment design, in which the windshield is arranged rather flatly, and the A-column extends up to the B-column of the passenger compartment arranged behind the front door of the motor vehicle.

A motor vehicle of the kind mentioned at the outset is known from DE 10 2005 016 993 A1. It also refers to the A-column as the A1-column, while the cross strut joined with this column is labeled as the A2-column. In this motor vehicle, a screen secured to the A1-column by clips covers the A1-column.

Motor vehicles, in particular passenger cars, are equipped with a plurality of airbags for safety considerations, which are intended to protect the vehicle occupants during a crash. In the area of the A-column and roof area of the passenger compartment adjacent to the doors and side windows, there are one or more head airbags, so-called roof rail airbags, which are situated between a cladding section or cladding sections and the mentioned area of the passenger compartment. When the airbags are activated, the deploying airbags move the cladding section away from the passenger compartment, in particular away from the A-column, and the airbag exits into the headroom area of the vehicle interior. It must here be ensured that the cladding section does not become detached. In other words, the cladding section must be prevented from being hurled away when the airbag is activated. DE 10 2006 002 467 A1 and US 2005/0116447 A1 describe cladding sections for airbags in motor vehicles, in particular in conjunction with head airbags.

At least one object of the present invention is to increase the safety of passengers during a crash in a motor vehicle of the kind mentioned at the outset.

One embodiment of the invention describes a complete cladding of the A-column and cross strut, which is easy to manufacture and assemble, wherein the goal is to ensure a simple and reliable deployment of the airbag. In addition, other objects, desirable features and characteristics will become apparent from the subsequent summary and detailed description, and the appended claims, taken in conjunction with the accompanying drawings and this background.

SUMMARY

The at least one object, and other objects, desirable features and characteristics, are achieved by mounting an airbag in the A-column, arranging it between the A-column and the first cladding section, and having it extend toward the front until over the area where the cross strut engages the A-column.

Preferably, it is provided that the first cladding section covers the airbag, and a second cladding section covers the cross strut, wherein both cladding sections comprise a single section.

Preferably, it is further provided that the first cladding section exhibits a flap section in the area in which the airbag extends behind the first cladding section, which is permanently joined with a base section of the first cladding section in the longitudinal direction on one side, and detachably joined with the base section on the opposing side.

The airbag is preferably designed as a so-called curtain airbag. It extends over the point where the cross strut is attached to the A-column in the vehicle and further to the front and downward, thereby ensuring that the head of the vehicle passengers cannot slip under the airbag during a side impact. The area between the A-column, cross strut and lateral wall section is here also covered, meaning the area in which a small side window is normally provided in the vehicle.

Designing the two cladding sections as a single section makes it possible to mount this unit in the area of the A-column and cross strut in an especially easy manner. It is here sufficient for the first cladding section to be joined with the A-column, and the second cladding section to cover the cross strut. However, it is viewed as advantageous if the second cladding section is also joined with the cross strut.

The permanent joining of the flap section with the base section of the first cladding section is understood as a connection that is maintained during activation of the airbag, and hence the movement of the flap into its open position, even after the airbag has been activated. This ensures that the flap section will not detach completely from the base section and be randomly flung into the interior of the vehicle. The other sides of the flap section can indeed be joined with the base section via a predetermined breaking point, wherein this predetermined breaking point tears when the airbag is activated, so that the flap can swivel around the side where it is permanently joined with the base section. In one advantageous embodiment, the flap section is only permanently joined with the base section in the area of one side, and the detachable connection between the flap section and base section is only provided on the side opposite this side. In particular, this detachable connection is designed as a positive connection. The positive connection can take the form of a latching connection, for example, in particular with at least one projection on the flap section and at least one rebound on the base section.

The detachable connection between the base section and flap section is preferably arranged on the side of the first cladding section facing the vehicle interior. As a result, the deploying airbag can open right toward the vehicle interior, or perpendicularly downward. Other than this, only a slight force is exerted on the flap section in this arrangement of the detachable connection between the base section and flap section, thereby ensuring that only slight forces are introduced into the base section by the flap section as the latter opens, so that little stress is placed on the permanent connection between the flap section and base section.

In a special embodiment of the invention, the flap section is permanently joined with the base section via spraying. The flap section can here indeed consist of a material other than the base section. This is even regarded as advantageous. For example, the flap section consists of an elastic material, in particular rubber. The elastic material is very well able to deform upon activation of the airbag, which hits the flap section, thereby deactivating in particular the latching connection between the flap section and base section, so that the flap section can swivel around the spraying point, which preferably extends over the entire length of the flap section. By contrast, the base section preferably consists of plastic. As a result, it has a higher stiffness than the flap section.

The advantage to the described cladding is that it consists of a single piece, involves lower tool costs, since only one tool is required for manufacturing purposes, and requires short assembly times. It is guaranteed that no part of the A-column cladding will become detached during airbag activation.

BRIEF DESCRIPTION OF THE DRAWINGS

The present invention will hereinafter be described in conjunction with the following drawing figures, wherein like numerals denote like elements, and:

FIG. 3 is a cross section through the A-column and its cladding cut perpendicular to the longitudinal run of the A-column, with airbag not activated; and FIG. 4 is a sectional view according to FIG. 2, illustrated with airbag activated.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
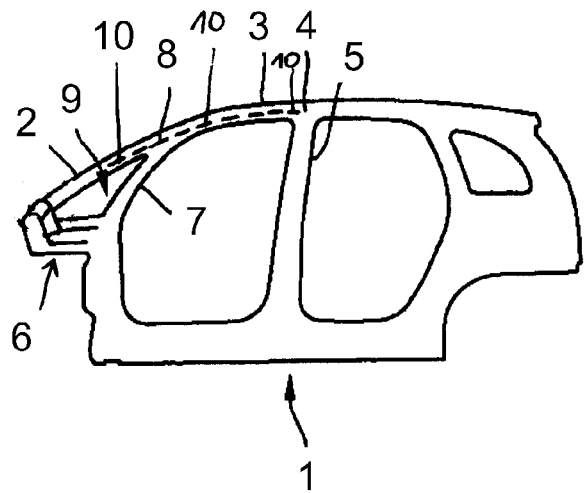
FIG. 1 is a schematic view of a passenger compartment of a motor vehicle, side view.

FIG. 1 shows an automobile passenger compartment 1, with an A-column 2 arranged to the side of a windshield of the vehicle, and this A-column is also arranged flatly owing to the relatively flatly running windshield, and extends in the front roof area 3 of the passenger compartment 1, which forms a knot 4 with the B-column 5 of the passenger compartment 1 located behind the vehicle door. It is indeed possible for the front roof area 3 to not be formed, but rather for the A-column 2 to extend to the knot 4.

The A-column is joined in the front with a lateral wall section 6 of the passenger compartment 1. A cross strut 7 engages the A-column 2 at about half its length, running at a steeper incline than the A-column 2 proceeding from the knot 8 formed between the A-column 2 and cross strut 7. The lower end of the cross strut 7 is also joined with the lateral wall section 6. In this way, a triangular opening 9 is formed between the lateral wall section 6, A-column 2 and cross strut 7. A side pane can be inserted into this opening. The latter is generally held in a frame, which is placed in the opening 9 and joined with the A-column 2, cross strut 7 and lateral wall section 6.

Various airbags are mounted in the passenger compartment 1 to protect vehicle occupants. A head airbag—roof rail airbag 10—denoted by a dashed line proceeds from the knot 4 in the area of the B-column 5 and extends along the front roof area 3 of the passenger compartment 1, and along the A-column 2 toward the front beyond the knot 8 up to about halfway between the knot 8 and attachment of the A-column 2 to the lateral wall section 6. The airbag 10 is mounted in the A-column 2 and front roof area 3. It extends toward the front beyond the knot 8 in the area of the cross strut 7.

According to an embodiment of the invention, both the A-column 2 and cross struts are clad on their sides facing the interior of the vehicle, so that the airbag 10 designed in particular as a curtain airbag is also clad.

Figure 2:
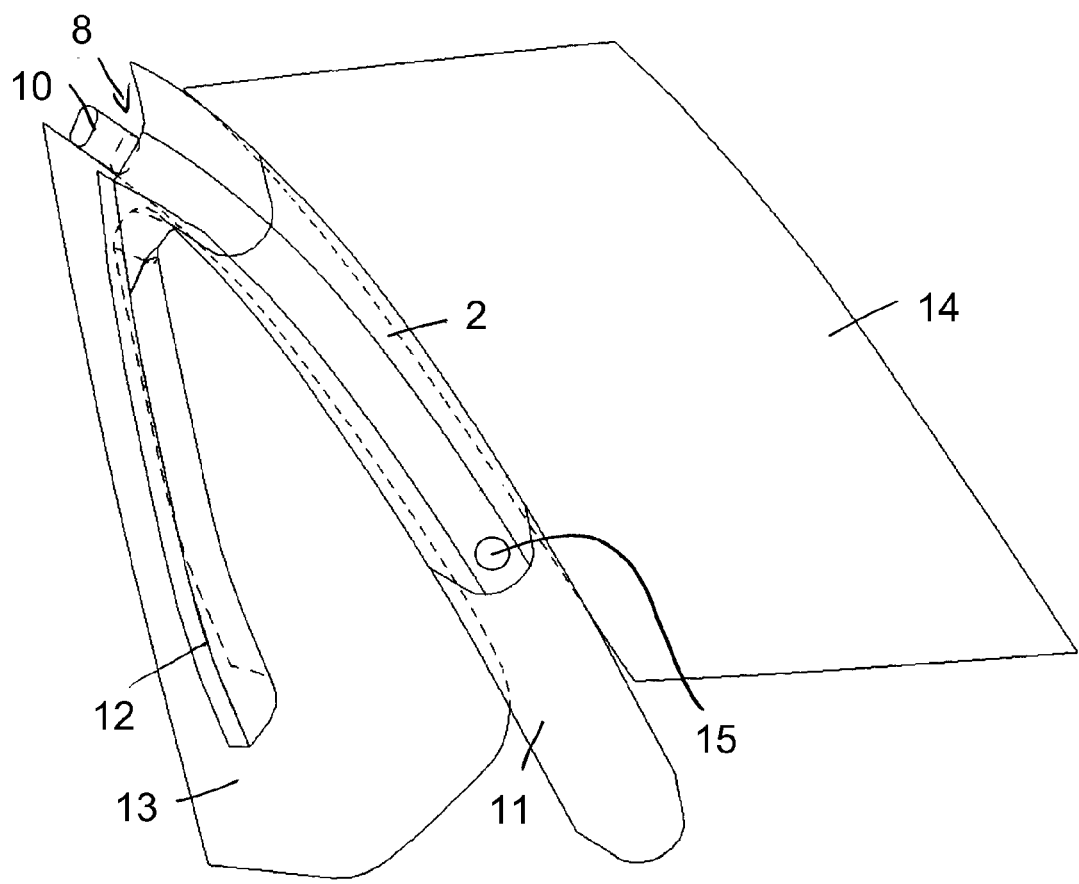
FIG. 2 is a simplified spatial representation of the arrangement of the clad A-column and cross strut, as well as the side pane arranged in the area between the A-column and cross strut, along with the windshield of the vehicle.

FIG. 2 shows the one-piece cladding of the A-column 2 and cross strut 7. This cladding consists of a first cladding section 11, which covers the A-column 2, and a second cladding section 12, which covers the cross strut 7. A fixed side pane 13 is arranged between the A-column 2 and cross strut 7 as well as the lateral wall section 6, in the area of the opening 9 depicted on FIG. 1. Also shown is the area of a windshield 14 adjacent to the A-column 2. The cladding section 11 for the A-column 2 is truncated to illustrate that the front and hence lower attachment point 15 of the airbag 10 designed as a curtain airbag far beyond the knot 8 in the joining area between the A-column 2 and cross strut, toward the front and exiting below (e.g., over two thirds of the length of the A-column 2 between the knot 8 and the front, lower end of the A-column 2, where the latter is joined with the lateral wall section 6).

FIG. 3 depicts the design of a first cladding section 11 for cladding the A-column 2. The airbag 10 mounted in the A-column is arranged between the A-column 2 and cladding section 11. Therefore, the cladding section covers the airbag 10.

The first cladding section 11 is shaped roughly like a U in cross section, wherein the free legs 19 of the cladding section 11 are joined by various clip connectors 16 with averted side areas 17 of the A-column 2, in that latching elements 18 of the clip connectors 16 are inserted into holes in the A-column 2, engaging them from the back.

The cladding section 12 for the cross strut 7 forms one part with the cladding section 11 for the A-column 2, and can also be provided with such clip connectors 16 for purposes of attachment with the cross strut 7. It is indeed conceivable to provide no such connectors, but rather ensure the positional stability of the cladding section 12 on the cross strut 7 by having the cladding section 12 encompass the cross strut 7.

The first cladding section 11 is designed as a flap section 20 in the area of the outwardly bulging web that joins the two legs 19 of the first cladding section 11. The two legs 19 form a base section 21 of the first cladding section 11, with which the flap section 20 is permanently joined. This base section 21 consists of a stable plastic. By contrast, the flap section 20 is made of an elastic material, in particular rubber. The flap section 20 is joined by spraying with the area of the base section 21 facing away from the vehicle occupants, as illustrated by the spraying point 22. The end of the flap section 20 facing away from the spraying point 22 is designed as a latching connection 23. Specifically, the flap section 20 is provided with a projection 24, and the base section 21 with a rebound 25.

The flap section 20 extends over the length of the first cladding section 11, which covers the airbag, meaning at least from the attachment point 15 of the airbag 10 to the joining area of the first cladding section 11 and second cladding section 12 in the area of the knot 8, but generally extending beyond that to the back up to the B-column 5 of the vehicle, and hence the knot 4.

In the event of a crash of the kind illustrated on FIG. 4, the curtain airbag 10 deploys, and hits the interior surface of the flap section 20. The flap section 20 bulges strongly as a result, thereby releasing the latching connection 23, and causing the flap section 20 to swivel around the spraying point 22, away from the vehicle occupants. As a result, the cladding section 11 creates enough space for the airbag 10 to exit into the interior of the vehicle. The arrow 26 on FIG. 4 indicates the direction in which the curtain airbag 10 exits during airbag activation.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle with a passenger compartment, comprising:
   an A-column arranged to a side of a windshield of the motor vehicle;
   a cross strut joined with the A-column and spaced apart from the A-column;
   a lateral wall section of the passenger compartment joining the A-column and the cross strut;
   a first cladding section on a side facing an interior of the motor vehicle that is joined with the A-column; and
   an airbag accommodated by the A-column that is between the A-column and the first cladding section and extends toward a front over an area where the cross strut is adapted to engage the A-column;
   wherein the first cladding section comprises a flap section in a second area in which the airbag extends behind the first cladding section, the flap section being permanently joined with a base section of the first cladding section via spraying.

2. The motor vehicle according to claim 1, further comprising a second cladding section that covers the cross strut, wherein the first cladding section is adapted to cover the airbag, and the first cladding section and the second cladding section comprise a single section.

3. The motor vehicle according to claim 1, wherein the flap section is joined with the base section in a longitudinal direction on one side, and detachably joined with the base section on an opposing side.

4. The motor vehicle according to claim 1, wherein the flap section comprises of an elastic material.

5. The motor vehicle according to claim 4, wherein the elastic material is a rubber.

6. The motor vehicle according to claim 1, wherein a connection between the flap section and the base section is a positive connection.

7. The motor vehicle according to claim 6, wherein the positive connection is a latching connection.

8. The motor vehicle according to claim 6, wherein the base section and the second cladding section are at least partially formed of plastic.

9. The motor vehicle according to claims 1, wherein a connection between the base section and the flap section is arranged on a second side of the first cladding section that faces the interior of the motor vehicle.

10. The motor vehicle according to claim 2, wherein the second cladding section is joined with the cross strut.

11. A motor vehicle with a passenger compartment, comprising:
    an A-column arranged to a side of a windshield of the motor vehicle;
    a cross strut joined with the A-column and spaced apart from the A-column;
    a lateral wall section of the passenger compartment joining the A-column and the cross strut;
    a cladding section on a side facing an interior of the motor vehicle that is joined with the A-column, the cladding section adapted to cover the airbag, the cladding section comprising a flap section in a second area in which the airbag extends behind the cladding section, which is joined with a base section of the cladding section in a longitudinal direction on one side, and detachably joined with the base section on an opposing side; and
    an airbag accommodated by the A-column that is between the A-column and the cladding section and extends toward a front over an area where the cross strut is adapted to engage the A-column.

12. The motor vehicle according to claim 11, wherein the flap section is permanently joined with the base section via spraying.

13. The motor vehicle according to claim 11, wherein the flap section comprises of an elastic material.

14. The motor vehicle according to claim 13, wherein the elastic material is a rubber.

15. The motor vehicle according to claim 11, wherein a connection between the flap section and the base section is a positive connection.

16. The motor vehicle according to claim 15, wherein the positive connection is a latching connection.

17. The motor vehicle according to claim 11, wherein the base section is at least partially formed of plastic.

18. The motor vehicle according to claim 11, wherein a connection between the base section and the flap section is arranged on a second side of the cladding section that faces the interior of the motor vehicle.

* * * * *